Figure 1:
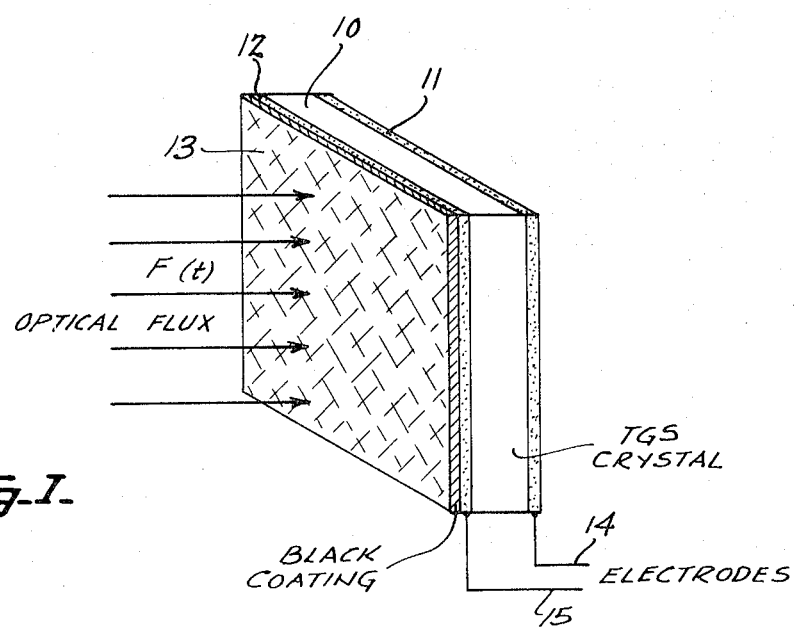

United States Patent
Lachambre

[15] 3,641,346
[45] Feb. 8, 1972

[54] PYROELECTRIC JOULEMETER USING A DIVERGENT LENS

[72] Inventor: Jean L. Lachambre, Charlesbourg, Quebec, Canada

[73] Assignee: Her Majesty the Queen in right of Canada as represented by the Minister of National Defence of Her Majesty's Canadian Government

[22] Filed: Mar. 20, 1970
[21] Appl. No.: 65,591

[30] Foreign Application Priority Data

Aug. 29, 1969  Canada...................................060798

[52] U.S. Cl. ......................250/83 R, 73/355 R, 250/83.3 H, 350/1, 350/311
[51] Int. Cl. .........................................................G01j 1/42
[58] Field of Search...................250/83.3 H, 83 R; 73/355 R; 350/1, 311

[56] References Cited

UNITED STATES PATENTS 3,539,803   11/1970   Beerman...........................250/83.3 H
3,511,991   5/1970    Beerman...........................250/83.3 H Primary Examiner—James W. Lawrence
Assistant Examiner—Morton J. Frome
Attorney—Cushman, Darby & Cushman

[57] ABSTRACT

A pyroelectric pulse energy measuring device is disclosed in which a pyroelectric element is mounted adjacent a heat sink and within a reflective container. A lens is provided at one end of the container so that incident radiation impinges on substantially the entire surface of the pyroelectric element, the amount of incident radiation being measured by the pyroelectric voltage output.

3 Claims, 3 Drawing Figures

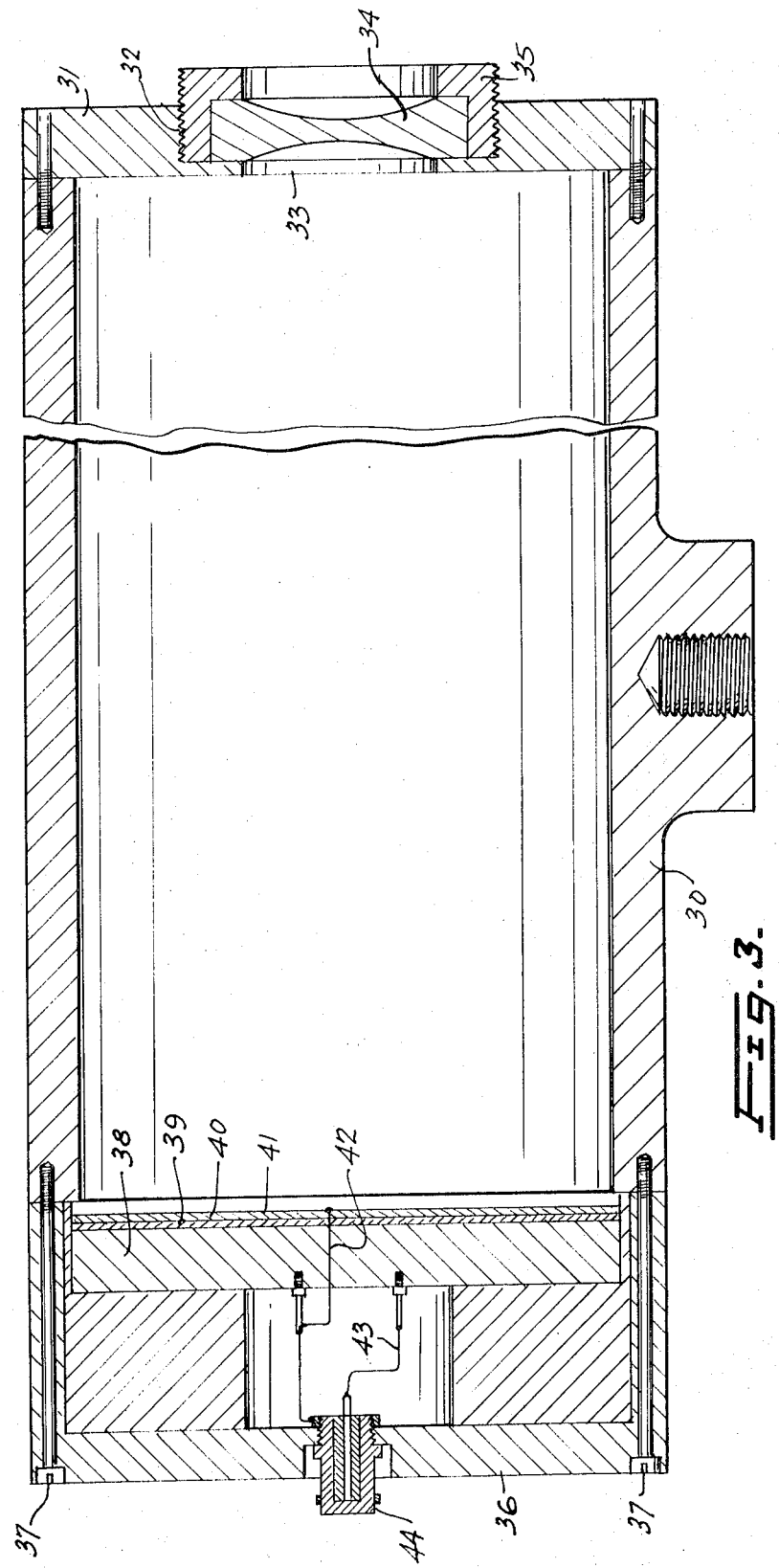

PYROELECTRIC JOULEMETER USING A DIVERGENT LENS

The present invention relates to a pyroelectric device for measuring the energy in a pulse of infrared radiation and in particular to a meter specially adapted for measuring the energy of a pulse laser beam having a high power density.

Known devices for the measurement of pulse radiation energy include cone-type ballistic joulemeters. Such devices employ a hollow metallic cone which absorbs the energy of an incident beam of radiation resulting in a rise in cone temperature which can be measured to determine the energy contained in the incident beam. At infrared frequencies such metallic cones become highly reflecting and tend to concentrate the energy at the apex of the hollow cone. Vaporization of the cone can thus occur at high energy levels. Another difficulty with this type of measurement device is that the response time is slow because the temperature rise cannot be measured until the temperature of the cone has stabilized following receipt of a pulse of incident radiation. Such response time may amount to 10 seconds, and recovery time is of the order of minutes.

The present invention provides an improved device for measuring high-power radiation pulses which employs a pyroelectric element in a manner adapted to avoid damage to the surface of the element while ensuring that all incident energy is converted to measurable heat.

It should be noted that all energy-measuring devices of this general class are suitable only for pulses of radiant energy. If the laser beam is continuous the beam must be chopped in accordance with known techniques before the absorption element is irradiated.

The present invention provides a new kind of energy meter based on pyroelectric effects, which is particularly suitable where moderately fast response time and high sensitivity are required in an energy detector that will operate at room temperatures. The meter of the present invention make use of the principle of pyroelectricity to generate an electrical signal proportional to the energy of infrared radiation pulse impinging the meter.

Figure 2:
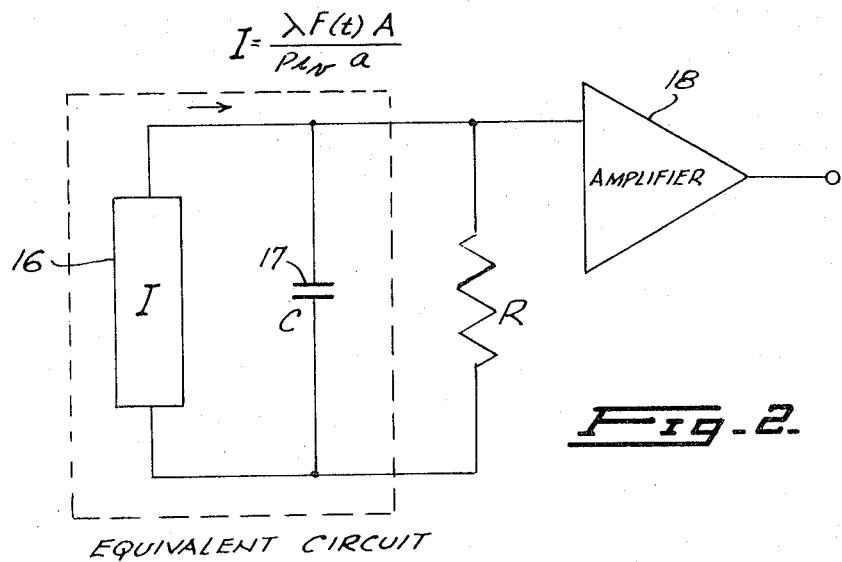

In the accompanying drawings which illustrate the theory and operation of a pyroelectric pulse radiation energy meter constructed in accordance with the present invention:

FIG. 1 is a perspective view schematically illustrating the operation of a pyroelectric device, FIG. 2 is the equivalent circuit of the pyroelectric device of FIG. 1, and FIG. 3 is a longitudinal section through a pyroelectric energy meter constructed in accordance with the invention.

A pyroelectric device is schematically illustrated in FIG. 1 and consists of a flat crystal element 10 of a pyroelectric substance. Each side of this crystal is provided with a metallic coating 11 and 12. The coating 12 on which the radiation flux impinges is provided with a black coating 13. Electrodes 14 and 15 are connected to the metallic coatings 11 and 12 for connection to external voltage-measuring circuitry such as a peak-reading voltmeter.

When a radiation flux such as infrared radiation from a laser impinges on the black coating 13 a charge displacement produces a voltage between the electrodes 14 and 15 which may be detected by a suitable measuring equipment.

Pyroelectricity is a known phenomenon. This effect is essentially due to anisotropy and will be consequently detectable in a crystal that has a very high degree of anisotropy. It has been shown experimentally that ferroelectricity increases this effect, because it adds a strong electrical axis in the crystal. It is then suitable, to look for pyroelectric material with a Curie temperature above but near room temperature.

Suitable materials for use in the pyroelectric detector of the present invention include crystal and ceramic substances such as triglycine sulphate, and lead zirconate titanate such as the ceramic material sold under the trademark Glennite HST 41.

The crystal is cut perpendicular to the polar axis in the form of a thin wafer and provided with metal coatings to form electrodes, and a black coating. The purpose of the black coating is to form a low reflecting surface which absorbs impinging radiation converting it to heat.

FIG. 3 is a longitudinal section on the centerline of an embodiment of an energy meter in accordance with the present invention. This energy meter has a square cross section. A rectangular tubular portion 30 having a polished interior surface is provided at one end with a cover 31 having a polished interior surface and provided with an aperture 32 having a shoulder 33 in which a divergent lens 34 formed of suitable material such as, for example sodium chloride, the lens 34 is held in position by a threaded retaining ring 35.

At the opposite end of the tubular portion 30 a pyroelectric device is mounted. An end cap 36 is secured to the tubular section 30 by mounting screws 37. Within the end cap 36 is an aluminum heat sink 38 to which a thin slab of pyroelectric ceramic material such as lead zirconium titanate is affixed by a conductive epoxy cement.

A metallic coating 40 such as a vapor-deposited silver layer is provided on the outer surface of the pyroelectric crystal 39 and the surface of the metallic coating 40 is covered with a layer of lampblack or other suitable black paint 41. An electrical contact 42 is connected to the outer metallic coating 40 utilizing a suitable adhesive such as silver glue, and a second electrical contact 43 is connected to the aluminum heat sink 38. The contacts 42 and 43 terminate at a coaxial cable connector 44.

A procedure for manufacturing the pyroelectric element utilized in the structure of FIG. 3 consists in cementing a slab of pyroelectric ceramic to the aluminum heat sink with a conducting epoxy, substantially grinding the thickness of the slab to provide the desired thin section such as ten-thousandths of an inch in thickness, vacuum depositing a layer of silver on the exposed face of the pyroelectric crystal and applying a layer of lampblack such as by painting. Depending on desired wavelength region of operation, different absorbing layers can be used.

The coaxial connector is connected by a suitable cable to a peak-reading voltmeter of suitably high input impedance or oscilloscope to indicate the energy input of infrared pulses entering the detector through the divergent lens 34. The radiation entering the detector through the lens 34 which does not immediately impinge on the black coating 41 or which is reradiated by this coating will be reflected from the polished internal faces of the tube 30 and the end plate 31 until it strikes and is absorbed by the coating 41.

In an actual device constructed pursuant to the provisions of FIG. 3, a meter was obtained capable of measuring energies up to 100 joules at 10.6 microns.

It should be emphasized that the pyroelectric ceramic should be thin since the sensitivity to pyroelectric effects is not a function of thickness whereas piezoelectric effects are a function of thickness, and piezoelectric voltages constitute a noise output of the meter. By maintaining the crystal suitably thin such as 0.01 inch, piezoelectric effects are reduced to insignificance without deteriorating the pyroelectric operation of the meter.

The embodiments of the invention in which an exclusive property or privilege is claimed are defined as follows:

1. A device for measuring the energy contained in a high-power beam of pulsed infrared radiation comprising: an elongated enclosure, a diverging lens mounted in one end of said enclosure, radiation-sensitive means having a radiation-absorbing face mounted in the opposite end of said enclosure; said radiation-absorbing face extending across substantially the full width of said elongated enclosure perpendicular to the axis of said lens, said lens being transparent to said infrared radiation and adapted to diverge a beam on the axis of said lens to illuminate substantially all of said radiation-absorbing surface; said enclosure having internal walls that are highly reflective at the frequency of said radiation; said radiation-sensitive means consisting of a pyroelectric element having said radiation-absorbing face adapted to absorb said energy and provide an electric output which is an indication of said energy in said beam.

2. A device for measuring the output energy of a $CO_2$ laser comprising a pyroelectric ceramic member mounted in one end of an internally polished tubular metallic enclosure having a divergent lens transparent to said radiation mounted on the other end of said tubular enclosure, said pyroelectric member being mounted on a heat sink and connected to a peak-reading voltmeter whereby when said pyroelectric member is irradiated over substantially the whole of its black face an electrical output is displayed by the peak-reading voltmeter or oscilloscope which is proportional to the energy of the laser beam.

3. A device as defined in claim 1 wherein said pyroelectric element is a lead zirconium titanate ceramic.

* * * * *